(12) United States Patent
Ghosh

(10) Patent No.: US 11,818,041 B2
(45) Date of Patent: Nov. 14, 2023

(54) CONTAINERIZED MANAGEMENT OF FORWARDING COMPONENTS IN A ROUTER USING ROUTING ENGINE PROCESSOR

(71) Applicant: Juniper Networks, Inc., Sunnyvale, CA (US)

(72) Inventor: Sandip Kumar Ghosh, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 235 days.

(21) Appl. No.: 17/247,872

(22) Filed: Dec. 28, 2020

(65) Prior Publication Data
US 2021/0385161 A1   Dec. 9, 2021

(30) Foreign Application Priority Data

Jun. 8, 2020   (IN) .............................. 202041023917

(51) Int. Cl.
*H04L 12/741* (2013.01)
*G06F 8/61* (2018.01)
*H04L 45/74* (2022.01)

(52) U.S. Cl.
CPC ............... *H04L 45/74* (2013.01); *G06F 8/63* (2013.01)

(58) Field of Classification Search
CPC ......... H04L 45/74; H04L 45/64; H04L 45/60; H04L 45/44; H04L 45/54; G06F 8/63; G06F 9/45558
USPC ........................................................ 370/392
See application file for complete search history.

(56) References Cited

U.S. PATENT DOCUMENTS

| | | | | |
|---|---|---|---|---|
| 8,806,058 B1* | 8/2014 | Mackie | .................. | H04L 45/00 709/242 |
| 8,953,623 B1* | 2/2015 | Eyada | .................. | H04L 47/125 370/401 |
| 9,397,913 B1* | 7/2016 | Nimmagadda | ..... | H04L 43/0835 |
| 9,594,621 B1* | 3/2017 | Navilappa | ........... | H04L 41/0654 |
| 9,843,540 B2* | 12/2017 | Agarwal | ............. | H04L 47/6295 |
| 2016/0094643 A1* | 3/2016 | Jain | ......................... | H04L 45/44 709/226 |
| 2016/0269318 A1* | 9/2016 | Su | ......................... | H04L 47/785 |
| 2017/0244787 A1* | 8/2017 | Rangasamy | ........ | H04L 67/1097 |
| 2017/0353433 A1* | 12/2017 | Antony | .................. | H04L 49/70 |
| 2018/0063000 A1* | 3/2018 | Wu | ....................... | G06F 9/45558 |
| 2018/0157561 A1* | 6/2018 | Venkatesh | ............ | G06F 3/0665 |
| 2018/0248770 A1* | 8/2018 | Regmi | ................ | G06F 9/45533 |
| 2018/0351882 A1* | 12/2018 | Jeganathan | ............. | H04L 45/02 |
| 2019/0052552 A1* | 2/2019 | Holbrook | .............. | H04L 43/026 |

(Continued)

*Primary Examiner* — Candal Elpenord
(74) *Attorney, Agent, or Firm* — Shumaker & Sieffert, P.A.

(57) ABSTRACT

In the present disclosure, systems and techniques for network device hardware containerization is described. In one example, a network device of a network having a topology of network devices includes processing circuitry of a routing component wherein the processing circuitry generates user space containers to operate forwarding engines in each of a plurality of forwarding components of the network device; stores information for directing communications involving the plurality of forwarding components and the network devices; and configures, by at least one user space container running on the processing circuitry of the routing component, one or more corresponding forwarding engines in a respective forwarding component using the information.

18 Claims, 6 Drawing Sheets

(56) References Cited

U.S. PATENT DOCUMENTS

2020/0067729 A1* 2/2020 Krayden ................. H04L 12/46
2020/0394048 A1* 12/2020 Chen ..................... G06F 9/4406

* cited by examiner

CONTAINERIZED MANAGEMENT OF FORWARDING COMPONENTS IN A ROUTER USING ROUTING ENGINE PROCESSOR

This application claims the benefit of IN Provisional Application No. 202041023917 filed Jun. 8, 2020, the entire content of which is herein incorporated by reference.

TECHNICAL FIELD

The disclosure relates to networking systems and, in particular, network device hardware containerization.

BACKGROUND

A computer network is a collection of interconnected computing devices that can exchange data and share resources. In a packet-based network, such as an Ethernet network, the computing devices communicate data by dividing the data into small blocks called packets, which are individually routed across the network from a source device to a destination device. The destination device extracts the data from the packets and assembles the data into its original form. Intermediate devices (referred to as network devices or nodes) are interconnected so as to provide an infrastructure for forwarding the packets between computing devices. For example, computer networks may include routers, switches, gateways, firewalls and a variety of other network devices.

At a network device, an operating system implements a number of components/features that configure hardware/software resources within the network device to operate as a router, a switch, a gateway, or the like. The operating system configures hardware components for routing and forwarding of the packets, for example, by invoking a number of routing protocols. There are instances when the network device must rely upon the operating system to configure the network device for the routing and forwarding of the packets.

SUMMARY

In general, the disclosure describes techniques that enable certain types of network device hardware virtualization. By doing so, these techniques provide efficient resource utilization in network devices such as those described herein. An example network device implementing the techniques described herein may employ various containerization technologies to virtualize one or more network device hardware components. Some example techniques enable network device hardware virtualization to route and forward packets to other network devices in a same network or in another network. Some example techniques provide virtualized hardware processing circuitry and allocate virtualized processor power to operate the one or more network device hardware components.

One example technique as described herein configures processing circuitry in a routing component that executes a routing engine process in a network device to also execute containers that manage forwarding components of the network device. The example technique generates user space containers to execute the code packages to run on the processing circuitry within the routing component. Each example user space container executes code packages to manage and/or operate a forwarding engine in the forwarding component. In some examples, another user space container may be instantiated to run the routing engine process.

For network devices that include forwarding components with a host hardware processor, virtualization of that host hardware processor by way of allocating a portion of routing component processing circuitry may be redundant. Such network devices either cannot employ network device hardware virtualization or are limited in virtualization capabilities. Implementing virtualization may be cost-prohibitive, for example, given substantial overhead costs involved in creating and managing virtual machines. The techniques described herein enable, in some examples, implementation of a router and/or a network device that includes forwarding components without any or without any significant processing infrastructure. Therefore, the techniques described herein provide a practical application of a technological improvement in network devices.

In one example, a method includes generating, by processing circuitry of a routing component of a network device of a network having a topology of network devices, user space containers to operate forwarding engines in each of a plurality of forwarding components of the network device; storing, by the processing circuitry of the routing component, information for directing communications involving the plurality of forwarding components and the network devices; and configuring, by at least one user space container running on the processing circuitry of the routing component, one or more corresponding forwarding engines in a respective forwarding component using the information.

In another example, a network device of a network having a topology of network devices includes processing circuitry of a routing component wherein the processing circuitry generates user space containers to operate forwarding engines in each of a plurality of forwarding components of the network device; stores information for directing communications involving the plurality of forwarding components and the network devices; and configures, by at least one user space container running on the processing circuitry of the routing component, one or more corresponding forwarding engines in a respective forwarding component using the information.

In another example, a computer-readable storage medium includes executable instructions that when executed by a processor, cause a system to: generate, by processing circuitry of a routing component of a network device of a network having a topology of network devices, user space containers to operate forwarding engines in each of a plurality of forwarding components of the network device; store, by the processing circuitry of the routing component, information for directing communications involving the plurality of forwarding components and the network devices; and configure, by at least one user space container running on the processing circuitry of the routing component, one or more corresponding forwarding engines in a respective forwarding component using the information.

The details of one or more examples are set forth in the accompanying drawings and the description below. Other features, objects, and advantages will be apparent from the description and drawings, and from the claims.

DETAILED DESCRIPTION

Figure 1:
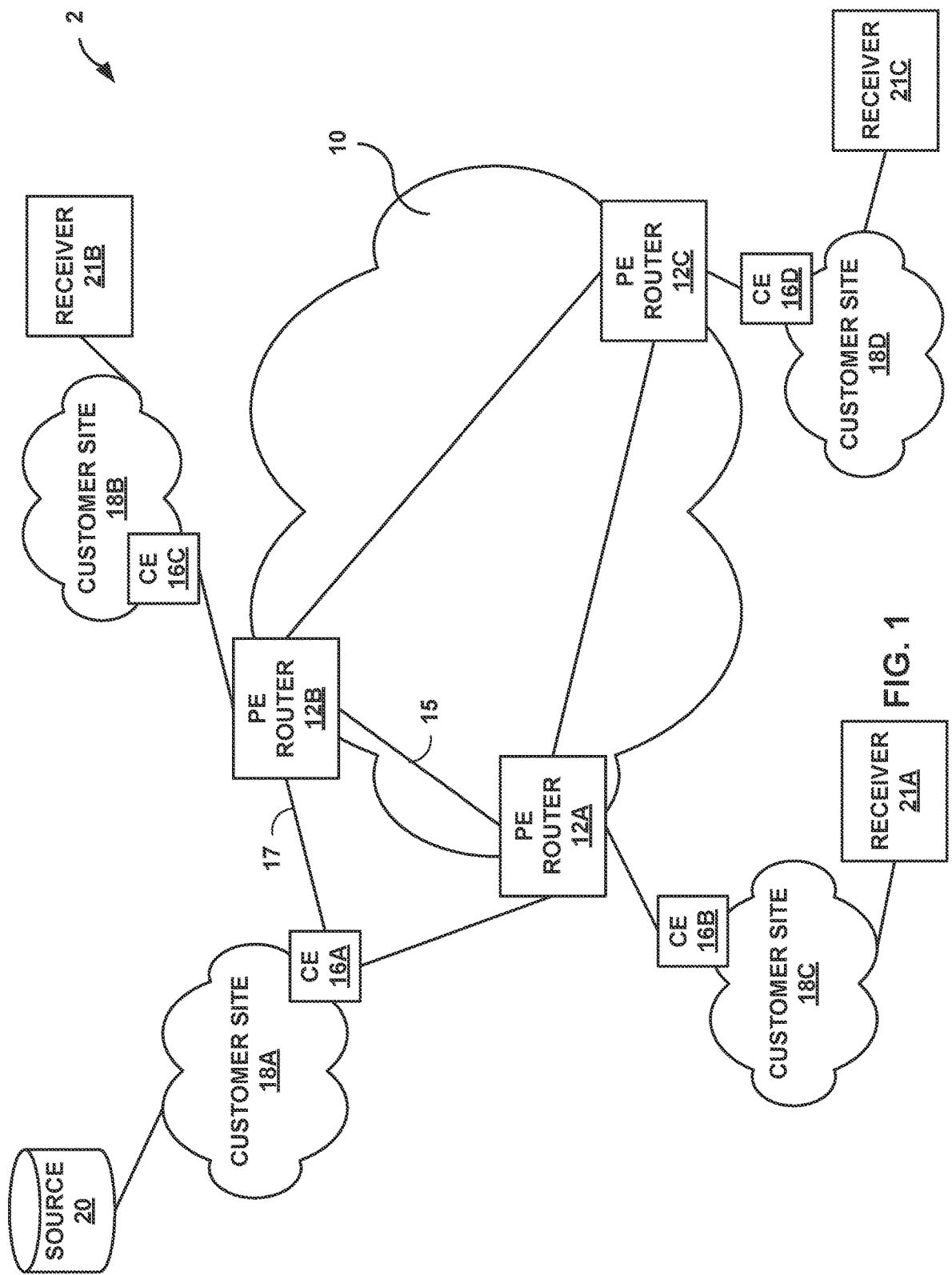
FIG. 1 is a block diagram illustrating an example system that operates in accordance with various aspects of the techniques described in this disclosure.

The present disclosure is a description of systems and techniques that improve network devices with virtualization/containerization technologies. As described herein, an example network device implementing an example technique leverages containerization technology (e.g., software) and user space containers to enhance the example network device's functionality (e.g., including routing and forwarding of packets). The example techniques described herein enable the example network device's control plane/routing component to operate and/or manage that device's forwarding components, abstracting away data plane/forwarding component functionality (e.g., forwarding engine operations) from the forwarding components. In some examples, the user space containers concentrate, in the routing component, execution of at least some portion or aspect of the forwarding engine operations, reducing the example network device's resource footprint while maintaining a desired performance level.

The disclosed techniques provide a number of benefits and advantages, including reductions in resource requirements and power consumption by the example network device. If a network device requires fewer resources, the network device may be manufactured to be of reduced size when compared to current or other network devices. Resources in the example network device include memory (e.g., volatile memory), storage (e.g., storage disk), processing (e.g., a multi-core processor), and network connectivity (e.g., bandwidth) resources to provide an operating environment for a container to execute a software stack that operates a forwarding engine in the forwarding component. Techniques in accordance with aspects of disclosure enable efficient storage of information, with little or no duplicate copies of information (e.g., routing and forwarding information) in the forwarding components. Techniques described herein avoid unnecessary consumption of processing cycles, such as for performing duplicative forwarding operations in the forwarding components. Alternative techniques may employ virtualization technologies (e.g., virtual machines) instead of containerization technologies such as the above-mentioned user space containers. Because some virtualization technologies may cause an increase in the example network device's resource footprint, some techniques reduce the example network device's resource footprint by employing containers instead of virtual machines.

Some network devices are implemented with a link (e.g., a system bus) coupling hardware components known as planes where each plane performs functionality that requires resources. A data or forwarding plane may include, as forwarding components, network interface cards (NICs) such as Physical interface cards (PICs), storage/memory, and a multi-core computing environment having a plurality of processing cores (collectively, "processing cores"). A typical network interface card includes interfaces configured to exchange packets using links of an underlying physical network. A control plane may include a routing component to run routing engine protocols to ensure that packets exchanged between devices are transmitted correctly and securely. A multi-core computing environment may include any number of processors and any number of hardware cores from, for example, four to thousands. Each of processing cores may include an independent execution unit to execute instructions that conform to an instruction set architecture for the core. Processing cores may each be implemented as separate integrated circuits (ICs) or may be combined within one or more multi-core processors (or "many-core" processors) that are each implemented using a single IC (i.e., a chip multiprocessor). Code executed in the multi-code computing environment of the typical network interface code is responsible for a variety of tasks of which at least two include maintaining (hardware) components of NICs and programming the interfaces to perform packet processing (e.g., packet forwarding operations).

However, in contrast to the some network devices, network devices implementing the techniques described herein might not include a multi-core computing environment within a forwarding plane. Instead of executing code in the multi-code computing environment of the forwarding plane to perform the above-mentioned maintenance and programming tasks, the techniques described herein have a routing component within a control plane execute code (e.g., same or similar code) to perform the above-mentioned maintenance and programming tasks. From that routing component, hardware components of the data plane may be reset and checked for faults; and some hardware components (e.g., ASICs) are programmed to perform all or part of a packet forwarding operation.

To illustrate by way of example, an example network device known as a modular chassis includes multiple Flexible PIC Concentrators (FPCs) where each FPC (e.g., line card) is a forwarding component that includes a host processor board with processing and memory/storage resources and programmable circuitry programmed with a forwarding engine for at least four PICs. The host processor board runs a forwarding component software stack which includes forwarding engine software (e.g., AFT, BCM SDK, etc.) to program the programmable circuitry (e.g., ASICs) and platform software to bring up the programmable circuitry and/or monitor the programmable circuitry via various sensors. Employing multiple FPCs provides the network device and its computer network with fault isolation and substantial processing power. However, the individual host processor board in each FPC causes a number of inefficiencies.

By implementing the techniques described herein, a number of advantages and benefits follow. One of the main advantages of a modular chassis with multiple FPCs/Line cards is that a fault is restricted to one line card. Similarly, faults within a container running the forwarding engine software will remain within that container. As another advantage/benefit, the individual host processor boards are reduced in size and/or capacity or removed entirely. The described techniques allow for additional PICs to be installed into an individual FPCs and/or for more FPCs to be installed into the modular chassis. In one example, these techniques may enable an FPC to include more than four PICs and/or a modular chassis to include more twenty FPCs. If more available space for additional network resources is not desired, some techniques enable the modular chassis to be smaller and more compact in size. In another example, these techniques may enable an FPC to include fewer hardware components such as memory resources. To illustrate by way of example, given a modular chassis having a control plane and twenty FPCs with four PICS each, each individual host processor board would typically maintain a database storing forwarding information and each copy of that database may require ten Gigabytes (GB) in memory (e.g., RAM), totaling in a minimum requirement of two-hundred and twenty GB in dedicated memory space for all twenty FPCs, the control plane, and a backup copy. Each processor board may require an additional 1 GB to store code for processing the forwarding information in the database (e.g., in performance of a packet forwarding operation), resulting a minimum memory footprint of two-hundred and forty-one (241) GB.

On the other hand, by adopting some of the described techniques in the present disclosure, the modular chassis can be manufactured with a smaller memory footprint and/or a more compact design. In one example, because user space containers are managing execution of the FPC software stack instead of the FPC's hardware, only one copy of the above-mentioned database of forwarding information is needed for all twenty FPCs and the control plane, resulting in a minimum memory requirement of thirty (30) GB for twenty user space containers and one database copy in the control plane. The control plane may require one or two GB in memory to store and execute code for virtualization/containerization platform software in addition to a routing engine, resulting in a minimum memory requirement of thirty-two (32) GB.

A number of implementations of the improved modular chassis include only a minimal amount of processing resources. Some implementations do not include a processor board. In one example, the user space containers in the control plane may insert into the programmable circuitry (e.g., ASICs) of the FPCs forwarding engine code (e.g., in an image file) such that each packet forwarding engines (PFE) in the FPCs of the improved modular chassis may require a modicum of memory space (e.g., 1 GB or less) and processing capacity to store and execute at least a portion of the FPC software stack. In some examples, the user space containers in the control plane provide one or more processor boards in the FPCs with code (e.g., in another image file) such that each processor board in the FPCs performs tasks in support of the PFEs. Hence, in addition to the improved minimal processing resource footprint, the improved minimum memory footprint in any implementation may be only thirty-two (32) GB in dedicated memory space in the control plane and twenty GB of total memory space in the twenty FPCs.

In some examples, the user space containers in the control plane do not provide the FPCs with code to perform packet forwarding operations; instead, the user space containers run the code to perform packet forwarding operations and (perhaps) the entirety of the FPC software stack. Some implementations of the user space containers run PFE/ASIC simulator code to simulate PFE/ASIC functionalities. In this manner, the user space containers operate as the PFEs for the FPCs of the data plane.

In other examples, the user space containers in the control plane provide the FPCs with a portion of the code to perform packet forwarding operations. A typical PFE includes of Layer 2/Layer 3 Packet Processing ASICs, Switch Interface ASICs, Internet Processor ASICs, and a memory subsystem (MMB), which includes the Queuing and Memory Interface ASICs. The user space containers in the control plane may provide the FPCs with code for configuring one or more of these ASICs to perform their original native function or a portion thereof. For example, the user space containers may insert code for only the Internet Processor ASICs into the memory subsystem of the FPCs, keeping code for remaining ASICs in an isolated execution environment for local execution. In some examples, Internet Processor ASICs run the code to perform the packet forwarding operations on internal processing resources (e.g., without a host processor board). The inserted code may include software for generating an abstraction (layer) through which the FPCs may access functionality for the remaining ASICs. That functionality may be implemented in the user space containers or in a hardware component. For example, code running in the FPC may invoke an API function through the abstraction layer and request (e.g., query) data or services from the user space containers.

To illustrate the above by way of the following example, when the PFE running in an example FPC receives incoming packets from PICs installed on the FPC, the above-mentioned ASICs perform their associated functions to forward the packets through data and switch planes to an appropriate destination port. The PFE may access forwarding information (e.g., a next hop or a next network) from the MMB to identify at least a portion of a route to reach the destination port. Alternatively, when a PFE running in an example FPC receives incoming packets from PICs installed on the FPC, the PFE queries (e.g., a corresponding user space container running in) the control plane for the forwarding information and forwards the packets through data and switch planes to an appropriate destination port. Each FPC contains a memory subsystem (MMB) that may be managed by the Queuing and Memory Interface ASICs. Instead of storing a database of forwarding information (e.g., Forwarding information base or FIB) in the memory subsystem, the PFE performs a lookup operation to a copy of the database of forwarding information stored in memory of the control plane. As an alternative, a PFE running in a corresponding user container to an FPC may perform the lookup operation to the copy of the database of forwarding information stored in the memory of the control plane and provide that forwarding information to the FPC to perform the actual forwarding through the data and switch planes.

In addition, since each of the individual host processor boards includes sufficient hardware (e.g., CPUs) to provide a computing environment, each host processor board adds substantial overhead costs, such as by increasing a cost (e.g., Capex) of a Chassis. The individual host processor boards also cause such network devices to consume a substantial amount of electrical power, for example, due to onboard processing and memory resources. Power consumption is a critical factor when evaluating networks. Techniques that reduce power consumption are desirous in relevant markets (e.g., data center market).

A network device in accordance with present disclosure may limit the processing resources in the forwarding component to an amount that each forwarding component needs to perform only necessary data plane functionality. The network devices may utilize a forwarding component without processor boards in the FPCs. One example process running on a forwarding component's processing resources (e.g., a dedicated IC such as a dedicated ASIC or processor) performs packet forwarding. The network device may utilize a user space container running on routing component hardware (e.g., processing circuitry) for programming of programmable circuitry in the forwarding component. The amount of processing resources required depends on the amount of programmable circuitry. For example, an FPC with more programmable circuitry requires more host processing power while an FPC with less programmable circuitry may require less host processing power. An FPC in an edge router tends to be more programmable than a data center switch and therefore, often requires more processing power. The programming of the programmable circuitry may refer to inserting data into the programmable circuitry (e.g., ASICs) and that data may include code to perform the necessary data plane functionality, which includes at least some portion or aspect of a packet forwarding operation as described herein. The data may further specify the PFE's data path for incoming packets to a port for transmission to a next network device. The programming of the programmable circuitry may further refer to installing forwarding information (e.g., identifying a route or a next hop). This is the major part of the job which FPC's processor board does. Virtualization of typical data plane functionality occurs in a spectrum; as described herein, other example code implementations perform additional aspects or a larger portion of the packet forwarding operation.

In some examples, a network device may include a routing component configured with a processor board capable of a substantial amount of processing power. For instance, such a processor board may include multi-core processors or microprocessors and possibly multiple processing cores. Such a processor board of a modular chassis may also include a RAM memory and SDD storage. In accordance with techniques described herein, the processing resources of routing engine may assume the workload of the FPC host processor board. In some examples, a proper isolation mechanism may be preferred to avoid conflicts. As described herein, containerization technologies may provide such isolation.

In accordance with one or more aspects of the present disclosure, a network device as described herein may be implemented without a FPC host processor board, with its functionality replaced by user space containers running in the routing component. In such an example, such containers may take over the role of the FPC host processor, for example, by managing and operating the forwarding engines that execute (packet) forwarding operations. Such a network device may more as or more competitive than network devices in which the FPCs include processor boards and/or hardware execution environments, but associated costs should also decrease, for example, due to the reduction of power consumption.

FIG. 1 is a block diagram illustrating an example system that operates in accordance with various aspects of the techniques described in this disclosure. The following description refers to system 2 as at least a portion of the example system.

In system 2, provider edge (PE) routers 12A-12C ("PE routers 12") are configured to prioritize session establishment for at least one customer in accordance with the techniques of this disclosure. System 2 includes an example computer network 10 in which PE routers 12 support a network to provide network service and manage traffic between source 20 and receivers 21 associated with customer sites 18A-18D ("customer sites 18"). Each of PE routers 12 couples to one or more customer sites 18 via customer edge (CE) routers 16A-16D ("CE routers 16"). In some examples, network 10 is referred to as a "core" network, and interfaces of PE routers 12 that couple to another PE router 12 may be referred to as "core-facing" interfaces.

Computer network 10, for example, may include a data center, a cloud service network, an enterprise network, a campus network, a service provider network, a home network, or another autonomous system. In any of these examples, remotely located source 20 and receivers 21A-21C ("receivers 21") within customer sites 18 may share data via computer network 10. As one example of network 10 as a service provider network, customer sites 18 are allocated varying service levels as captured in Service Level Agreements (SLAs). At least two of customer sites 18 may be separate customers that pay for different service levels: A first high priority customer site 18A is provided a larger resource allocation than a second low priority customer site 18B whose communication sessions are established after the first customer site 18A's communication sessions.

As one example of network 10 as an enterprise network, each of customer sites 18 may comprise one or more servers or employee computer terminals located in different regions of a single office location. As another example of network 10 as an enterprise network, each of customer sites 18 may comprise a remote office location of a corporation such that computer network 10 may be extended across a public network, such as the Internet. Although illustrated in FIG. 1 as an enterprise network or a service provider network, the techniques of this disclosure are applicable to other network types, both public and private. Examples of other network types include local area networks (LANs), virtual local area networks (VLANs), virtual private networks (VPNs), and the like. In some examples, computer network 10 may be coupled to one or more additional private or public networks, e.g., the Internet. In other examples, computer network 10 may comprise the Internet or another public network. In some cases, computer network 10 may comprise a multi-protocol label switching (MPLS) network. In the illustrated example, computer network 10 includes PE routers 12. Although not illustrated, network 10 may include additional edge routers and/or core routers not shown.

Each of customer sites 18 may include a local area network (LAN) or a wide area network (WAN) that comprises a plurality of subscriber devices, such as desktop computers, laptops, workstations, PDAs, wireless devices, network-ready appliances, file servers, print servers or other devices. In some cases, customer sites 18 may be configured to support multicast traffic, such as Internet Protocol Television (IPTV), desktop conferences, corporate broadcasts, music and video web casts, and other forms of multimedia content.

In FIG. 1, PE router 12B receives/transmits packets as a destination/source or operates as an intermediary exchanging packets between network devices, for example, a local CE, such as CE router 16C, and another PE, such as PE router 12A. Each packet reception/transmission involves PE router 12B directing the packets along a path toward an appropriate destination. To enable such packet receptions/transmissions, PE router 12B configures its routing and forwarding components with information regarding computer network 10, such as information describing other routers as well as paths between PE router 12B and the other routers. Examples of such information include tables storing mappings between identifiers (e.g., names) and addresses (e.g., Media Access Control (MAC) addresses) for the other routers and the paths. PE router 12B processes such information to determine, for instance, which routers are neighbors/peers (e.g., BGP peers) and which paths (e.g., label switched paths (LSPs)) include PE router 12B and therefore, require computing time/resources from PE router 12B. PE router 12B runs communication sessions for a number of protocols to generate and then, propagate such information. As described herein, some example protocols include Border Gateway Protocol (BGP) and Resource Reservation Protocol (RSVP).

Virtualization in general can provide several advantages, particularly for computer network 10. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the computing infrastructure. As physical computing resources become fungible resources, such as in a cloud-based computing environment, provisioning and management of the computing infrastructure becomes easier. Thus, enterprise IT staff often prefer virtualized compute clusters in data centers for their management advantages in addition to the efficiency and increased return on investment (ROI) that virtualization provides.

Containerization is a virtualization scheme based on operation system-level virtualization. Containers are lightweight and portable execution elements for applications that are isolated from one another and from the host. Because containers are not tightly-coupled to the host hardware computing environment, an application can be tied to a container image and executed as a single light-weight package on any host or virtual host that supports the underlying container architecture. As such, containers address the problem of how to make software work in different computing environments. Containers offer the promise of running consistently from one computing environment to another, virtual or physical.

Any network device of network 10 (e.g., CE Routers 16A-C or PE routers 12A-C) may be configured with virtual execution elements by virtualizing resources of that router to provide an isolation among one or more virtual forwarding engines running on processing circuitry of a routing component. "Hypervisor-based" or "hardware-level" or "platform" virtualization refers to the creation of virtual machines that each includes a guest operating system for executing one or more processes. In general, a virtual machine provides a virtualized/guest operating system for executing applications in an isolated virtual environment. Because a virtual machine is virtualized from physical hardware of the router, executing virtual forwarding engines are isolated from both the hardware of the router and other virtual machines. Each virtual machine may be configured with one or more virtual network interfaces for communicating on corresponding virtual networks. While virtual machines may be used to implement the techniques described herein, other virtual execution elements may be more efficient for abstracting away forwarding component functionality. Containers, for instance, may be used over virtual machines for a number of reasons: as one reason, virtual machines consume significant capacities of resources and are suited for virtualizing devices, such as virtual routers rather than the forwarding engines; and as another reason, virtual machines run in kernel space whereas containers 25 are user space containers and therefore, do not require extra-processing steps.

"Container-based" or "operating system" virtualization refers to the virtualization of an operating system to run multiple isolated systems on a single machine (virtual or physical). Such isolated systems represent containers, such as those provided by the open-source DOCKER Container application, by CoreOS Rkt ("Rocket"), or by LINUX Containers ("LXC"). Like a virtual machine, each container is virtualized and may remain isolated from the host machine and other containers. However, unlike a virtual machine, each container may omit an individual operating system and provide only an application suite and application-specific libraries. In general, a container is executed by the host machine as an isolated user-space instance and may share an operating system and common libraries with other containers executing on the host machine. Thus, containers may require less processing power, storage, and network resources than virtual machines. A group of one or more containers may be configured to share one or more virtual network interfaces for communicating on corresponding virtual networks.

In some examples, containers are managed by their host kernel to allow limitation and prioritization of resources (CPU, memory, block I/O, network, etc.) without the need for starting any virtual machines, in some cases using namespace isolation functionality that allows complete isolation of an application's (e.g., a given container) view of the operating environment, including process trees, networking, user identifiers and mounted file systems. In some examples, containers may be deployed according to LINUX Containers (LXC), an operating-system-level virtualization method for running multiple isolated Linux systems (containers) on a control host using a single LINUX kernel. LXC is an operating-system-level virtualization method for running multiple isolated Linux systems (containers) on a single control host (LXC host). An LXC does not use a virtual machine (although an LXC may be hosted by a virtual machine). Instead, an LXC uses a virtual environment with its own CPU, memory, block I/O, network, and/or other resource space. The LXC resource control mechanism is provided by namespaces and cgroups in the Linux kernel on the LXC host. Additional examples of containerization methods include OpenVZ, FreeBSD jail, AIX Workload partitions, and Solaris containers. Accordingly, as used herein, the term "containers" may encompass not only LXC-style containers but also any one or more of virtualization engines, virtual private servers, silos, or jails.

With containers' inherently lightweight nature, a single host can often support many more container instances than traditional virtual machines (VMs). Often short-lived, containers can be created and moved more efficiently than VMs, and they can also be managed as groups of logically-related elements (sometimes referred to as "pods" for some orchestration platforms, e.g., Kubernetes). These container characteristics impact the requirements for container networking solutions: the network should be agile and scalable. VMs, containers, and bare metal servers may need to coexist in the same computing environment, with communication enabled among the diverse deployments of applications. Computer network 10 should also be agnostic to work with the multiple types of orchestration platforms that are used to deploy containerized applications.

Techniques described herein leverage virtualization (e.g., containerization) to improve operation of routers 12, 16 and other example network devices of computer network 10, for example, by improving efficiency of network devices. These techniques apply virtualization (e.g., containerization) to improve (e.g., optimize) a resource footprint of a network device.

Routers 12, 16 and other network devices generally follow a multi-plane architecture where a control plane operates a routing component and a data plane operates at least one forwarding component; however, in accordance with the described techniques of the present disclosure, the control plane includes processing resources to assume (e.g., replace) at least a portion of the role of a host processor in the at least one forwarding component. An example host processor in an example forwarding component may refer to an embedded general-purpose processor or microprocessor in a host processor board. While an example forwarding component's host processor may perform management/supervisory operations such as programming the PFE ASICs with code and data for forwarding packets to a next hop of a route, monitoring communications between the PFE ASICs, running diagnostics and maintenance tasks, bringing up and taking down PFE components, and/or the like, the control plane of routers 12, 16 and other network devices of the present disclosure includes sufficient processing resources for these management/supervisory operations. In some examples, none of the forwarding components in the data plane utilize a host processor for such a host processor is duplicative, and having duplicate processing resources results in redundant processing tasks consuming valuable processor cycles (unnecessarily). The present disclosure describes processing resources as inclusive of any type of hardware execution element such as a hardware processor (e.g., CPU), a microprocessor, a multi-core processing environment, dedicated hardware, and/or the like.

Some network devices include forwarding components having more than a trivial capacity of processing resources whereas some network devices in accordance with present disclosure include forwarding components having at most a minimal capacity of processing resources. Instead of the host processor board with a general-purpose processor or micro-processor, some network devices in accordance with present disclosure include a forwarding component configured with a hardware execution element (e.g., a dedicated ASIC or a co-processor) with sufficient processor capacity for packet transmission (e.g., only packet transmission). While the control plane of such network devices performs the management/supervisory operations, the hardware execution element performs the forwarding operations that move packets through the data plane until transmission through a port. Example forwarding components include physical interface cards (PICs), flexible physical interface cards (FPCs), dense port concentrators (DPCs), and/or the like.

Compared to the above-mentioned network devices, network devices that do not implement any of the techniques described herein include a plurality of forwarding components (e.g., physical line cards or PICs) or multiple pluralities of forwarding components (e.g., multiple collections of two or more PICs combined with PFE ASICs such as in flexible PIC concentrators (FPCs)). In an example network device (e.g., a modular chassis or another large router) having multiple FPCs, each FPC includes a host processor board with processing and memory/storage resources and programmable circuitry programmed with forwarding engines for at least one PIC. These forwarding components of these network devices assume a larger burden than the above-mentioned network devices implementing at least one technique described herein. Each includes redundant memory and/or processing resources for storing/processing multiple copies of routing and/or forwarding information.

To further illustrate the differences between devices, network devices that do not implement any of the techniques described herein typically have installed (e.g., embedded) PFE chips, for example, in ASICs, which may be grouped into at least four categories: Routing ASICs for providing a Lookup Unit (LU) chip; Forwarding ASICs for providing MQ chips for Memory and Queuing; Enhanced Class of Service (CoS) ASICs; and Interface Adaptation ASICs. To execute these ASICs and operate the PFE, each forwarding component (e.g., a line card) includes processing resources configured to run an operating system component (e.g., a microkernel (or μKernel) or a LINUX-based operating system kernel). These processing resources may include a CPU or a micro-processor including one or more processors of which each includes an independent execution unit that may be implemented as a separate integrated circuit (IC) or may be combined within one or more multi-core processors (or "many-core" processors) that are each implemented using a single IC (i.e., a chip multiprocessor). Implementing at least one technique described herein results in resource savings for that network device, further reducing the network device's resource footprint.

The operating system component handles packet processing in software and may provide a micro-operating system with several processes (e.g., threads) that run on top of the processing resources. The operating system component, via the processing resources, is interconnected with other hardware components of the network device via several types of links: Ethernet, PCIe (Peripheral Component Interconnect express), HSL2 (High Speed Link version 2), and/or the like. The operating system component, via the processing resources and an Ethernet connection, communicates with a control unit (or routing component) to access routing engine processes. The operating system component, via the processing resources and a PCIe connection, may be operative to program the ASICs, push the forwarding information base (FIB) to local chip memory and basic scheduling configuration to the MQ chips. The PFE's ASICs communicate with each other and with switch fabric chips via HSL2. Implementing at least one technique described herein eliminates some (if not all of the above operations, resulting in significant savings when abstracting away these operations to the routing component.

The PFE hardware and the forwarding engine software stack running on the operating system component require processing resources to operate (e.g., as packet processors). Sometimes, the routing engine and the PFE perform duplicate tasks, further increasing the network device's resource footprint. Sometimes, the network device may allocate one of the Packet Forwarding Engine's CPU cores to a routing protocol daemon and as a result, the device's throughput performance is reduced.

Instead of installed PFE chips, a forwarding engine software stack running on the routing component (e.g., in a user space container) may configure a forwarding engine on a system on chip (SoC) and that forwarding engine operates a forwarding pipeline, for example, having ingress and egress forwarding pipeline stages for packets to or from the front panel ports. The forwarding pipeline can be separated into two phases: the ingress flow and egress flow where the ingress flow is responsible for the majority of switching functions, including address learning, VLAN assignment, L2 and L3 forwarding lookups, QoS classification and Ingress ACL processing, and the Egress flow provides packet buffering, the packet rewrite and egress ACL processing. The forwarding engine software stack may insert, into (e.g., programming circuitry such as a programmable processor of) the SoC, program code for performing the tasks for the ingress and egress forwarding pipeline stages.

Implementing at least one technique described herein offloads execution of the forwarding engine software stack to the routing component, resulting in considerable savings in processing resource capacities. In one example, the forwarding engine software stack executing in a user space container running in the routing component may insert code and data into the SoC, creating the forwarding engine in the forwarding component, and run management/supervisory tasks on that forwarding engine.

In accordance with one or more aspects of the present disclosure, network devices such as PE router 12A or CE router 16A may be implemented such that substantially all (if not most) of the above-mentioned hardware used in the forwarding components (e.g., FPCs) is not present. The forwarding component of such a network device includes little or no processing resource capacity; for example, neither a CPU nor a multi-core microprocessor environment is included in the forwarding component in some examples. In such an example, the network device may include little or no dedicated hardware, and may have only a sufficient amount for moving packets through forwarding component infrastructure and transmitting the packets through the ports.

In another example, these network devices may reduce their resource footprint by virtualizing forwarding engines of the forwarding components from the routing engine of the routing component. In one such example, instead of relying upon expensive, large, and/or resource-heavy forwarding component hardware, these network devices apply forwarding engine virtualization to enable installation of smaller, inexpensive, and/or resource-thin forwarding component hardware.

In another example, forwarding components in these network devices include a minimum capacity of processing resources (if at all); and without a hardware processor or a micro-processor, such network devices and resident forwarding components are smaller in size when compared to other network devices. In another example, by abstracting away forwarding engine operations from the forwarding components, the forwarding engine's remaining (minimal) processing resources (e.g., CPU cores) may focus on packet forwarding transmission and increasing throughput performance.

Figure 2:
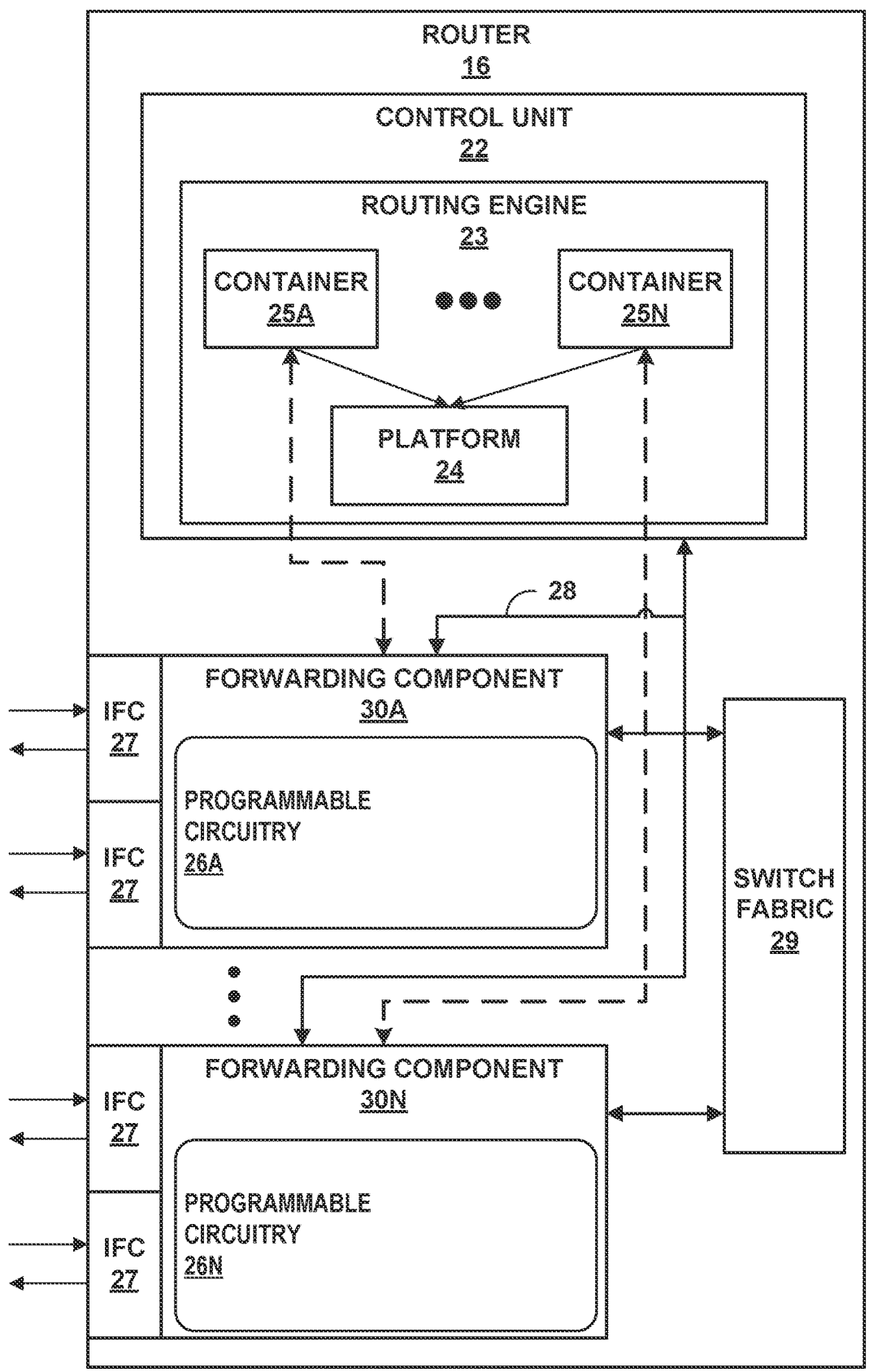
FIG. 2 is a block diagram illustrating an example network device that operates in accordance with various aspects of the techniques described in this disclosure.

FIG. 2 is a block diagram illustrating an example network device, in accordance with one or more techniques of this disclosure. FIG. 2 depicts the router 16 as an example network device for explanatory purposes. Router 16 may be a provider edge router of system 2 of FIG. 1. As an alternative, the example network device may be a customer edge router, or another type of network device, such as a switch. It is noted that the example network device may be any type of networking device including a data center switch, a data center router, an access router, and/or the like.

In this example, router 16 includes a control unit 22 that provides control plane functionality for the device. Control unit 22, operating as a routing component for router 16, provides routing plane functionality via a routing engine 23 and handles routing and forwarding operations in support of network services provided by system 2. In some examples, routing engine 23 includes a chipset with processing hardware (e.g., circuitry) and (non-removable and/or removable) volatile/non-volatile storage hardware (e.g., memory) in multiple forms (e.g., and for multiple purposes). One example processing hardware is a micro-processor (or microprocessor) may include one or more processors each including an independent execution unit to perform instructions that conform to an instruction set architecture, the instructions stored to storage media. Example execution units may be implemented as separate integrated circuits (ICs) or may be combined within one or more multi-core processors (or "many-core" processors) that are each implemented using a single IC (i.e., a chip multiprocessor). An example chipset includes a Peripheral Component Interconnect (PCI) platform with a CPU coupled, via a bus, to FLASH memory and RAM.

Techniques described herein for network device hardware virtualization include techniques for allocating routing engine hardware to manage and/or control forwarding components 30A-N ("forwarding components 30") and/or assume responsibility of (packet) forwarding engines. To illustrate by way of example, these techniques may off-load to the processing hardware of routing engine 23 the initialization and monitoring of forwarding component hardware (e.g., PICs, PFE ASICs, ports, and/or the like) and the programming of forwarding/data path (e.g., through PFE ASICs) as per instruction receive from routing engine 23. Hence, the processing hardware of routing engine 23 assumes the role of a host processor in the forwarding components 30.

Examples of forwarding components 30 include physical interface cards (PICs), flexible physical interface cards (FPCs), dense port concentrators (DPCs), and/or the like. An example routing engine 23 includes processing resources such as a CPU (or another hardware processor); memory resources such as SDRAM for storage of the routing and forwarding tables and routing engine processes; a compact FLASH disk for primary storage of code packages (e.g., software images), container image files, configuration files, and microcode; and a hard disk for secondary storage.

As described herein, platform 24 may include virtualization or containerization software configured to provide an operating environment for user space containers 25. In some examples, platform 24, using the container image files, instantiates user space containers 25A-N ("containers 25") to run on the CPU of routing engine 23 and execute one or more code packages including a software stack for configuring routing engine 23 and/or a software stack for configuring forwarding components 30. By virtualizing forwarding component hardware as containers 25—effectively generating virtual forwarding components with virtual forwarding engines—control unit 22 enables routing engine 23 to control packet processing on incoming/outgoing packets. As one example improvement over other network devices, the virtual forwarding engine (e.g., forwarding engine processes) creates one or more forwarding tables for storage in control unit 22 (and possibly for installation to forwarding components 30). As another example, when an interface cards on forwarding component 30A receives an example packet, instead of that forwarding component 30A or any other hardware in the date plane, control unit 22 via routing engine 23 hardware performs a forwarding operation (e.g., a forwarding table lookup operation) to identify a next destination (e.g., a next hop or a next subnet) for the packet and then, instruct forwarding component 30A to communicate the packet to a next destination.

Platform 24 may create each container image file to include one or more of the above-mentioned code packages and other software packages. In addition to the container image files, platform 24 maintains information on SDRAM of routing engine 23 for properly running user space containers 25 and exchanging information between user space containers 25A-N and forwarding components 30A-N. As described herein, some of the exchanged information includes configuration data for forwarding components 30A-N and any forwarding engine therein. The configuration data may include code to be inserted into programmable circuitry 26A-N for operating a forwarding engine. Another example of exchanged information includes instructions on forwarding packets from interface cards 27A-27N ("IFCs 27") to a next destination (e.g., a next hop on a learned route).

Control unit 22 loads routing engine 23—as either an insertable unit or a dedicated unit—invoking critical processes (e.g., startup programs) for operating the routing component of router 16. Routing engine 23, in turn, executes the above-mentioned critical processes and other routing engine processes such as those controlling router functionality and a kernel, which enables communication between routing engine processes and operational control of forwarding engines in forwarding components 30. As described herein, routing engine 23's kernel may operate as a direct link (e.g., an interface) to forwarding components 30. In some examples, once the kernel is fully operational, control unit 22, via platform 24, generates user space containers 25 and enables communications between virtual forwarding engines running in user space containers 25 and the forwarding engines in forwarding components 30. User space containers 25 include any container type described herein. Platform 24 refers to any of the virtualization or containerization technologies described herein.

Routing engine 23, via one of containers 25 such as container 25N, may execute various code packages to run routing engine processes including routing protocols. Container 25N runs the routing protocols for routing engine 23 (e.g., as computing processes and objects) on an allocated portion of routing engine 23's processing resources. In one example, container 25N is configured to generate and store information directing packet communications between router 16 and other network devices in network 10. Examples of such information includes routing and forwarding information. In some examples, container 25N—on behalf of routing engine 23—creates a routing table consisting of routes learned by all routing protocols running in the control unit 22. Container 25N interprets the routing table, generates a subset of routes to be used for all forwarding purposes, and places them in the forwarding table. Container 25N may also run a micro-operating system (e.g., a microkernel or p-kernel) for the forwarding engines. Container 25N, via the micro-operating system, may communicate with microcode running in the forwarding engines. In this manner, control unit 22 and routing engine 23 cooperate as a unit and may be collectively referred to the routing component for the example network device.

Control unit 22 may be distributed among multiple entities, such as one or more routing engine chipsets and one or more service cards insertable into a chassis. In such instances, router 16 may therefore have multiple control planes. Router 16 also includes a plurality of forwarding components 30A-30N ("forwarding components 30") and a switch fabric 29 that together provide a forwarding plane for forwarding and otherwise processing subscriber traffic. Forwarding components 30 receive and send data packets via interfaces of IFCs 27 each associated with a respective one of forwarding components 30. Each of forwarding components 30 and its associated ones of IFCs 27 may be a separate line card for router 16 (not shown). In some examples, forwarding components 30 may be packet forwarding engines (PFEs). Example line cards include flexible programmable integrated circuit (PIC) concentrators (PFCs), dense port concentrators (DPCs), and modular port concentrators (MPCs). Each of IFCs 27 may include interfaces for various combinations of layer two (L2) technologies, including Ethernet (e.g., 400G Ethernet), Gigabit Ethernet (GigE), and Synchronous Optical Networking (SONET) interfaces. In various aspects, each of forwarding components 30 may comprise more or fewer IFCs. Switch fabric 29 provides a high-speed interconnect for forwarding incoming data packets to the selected one of forwarding components 30 for output over a network.

Control unit 22 is connected to each of forwarding components 30 by internal communication link 28. Internal communication link 28 may comprise a 1 Gbps or 10 Gbps Ethernet connection, for instance. In addition to the routing protocol processes and the forwarding engine processes (e.g., virtual forwarding engines) executed by containers 25, daemons executed by control unit 22 are user-level processes that run network management software, execute configuration commands received from an administrator, and manage subscriber flow processing, among other functions.

Control unit 22 may include processing circuitry (e.g., one or more processors) that execute software code or instructions, such as those used to define a software/computer program or a code package comprising a number of programs, stored to a computer-readable storage medium (again, not shown in FIG. 1), such as non-transitory computer-readable mediums including a storage device (e.g., a disk drive, or an optical drive) and/or a memory such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause the one or more processors to perform techniques described herein. Alternatively, or in addition, control unit 22 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Forwarding components in accordance with the techniques described herein may include a minimum capacity of processing circuitry to operate packet forwarding engines or include no processing circuitry (i.e., a hardware processor-less forwarding component) and perform a bare minimum number of tasks for completing forwarding operations. An example of minimum processing circuitry may, in some cases, may include only a microprocessor. Processing circuitry may, in some cases, be separate from a microprocessor. Processing circuitry of the example network device's routing component—which is control unit 22—serves as a substitute for processing circuitry typically found in conventional forwarding components. Processing circuitry of the routing component may be used to provide forwarding plane functionality. Processing circuitry that executes software instructions, such as those used to define a software or computer program, stored to a computer-readable storage medium. Computer-readable storage medium includes non-transitory computer-readable mediums including a storage device (e.g., a disk drive, or an optical drive) and/or a memory such as RAM (including various forms of DRAM, e.g., DDR2 SDRAM, or SRAM), Flash memory, another form of fixed or removable storage medium that can be used to carry or store desired program code and program data in the form of instructions or data structures and that can be accessed by a processor, or any other type of volatile or non-volatile memory that stores instructions to cause processing circuitry to perform techniques described herein. Alternatively, or in addition, forwarding component 30A may include dedicated hardware, such as one or more integrated circuits, one or more ASICs, one or more ASSPs, one or more FPGAs, or any combination of one or more of the foregoing examples of dedicated hardware, for performing the techniques described herein.

At least two forwarding components of forwarding components 30 include programmable circuitry 26A that processes packets by performing a series of operations on each packet over respective internal packet forwarding paths as the packets traverse the internal architecture of router 16. Programmable circuitry 26A of forwarding component 30A, for instance, includes one or more configurable hardware chips (e.g., a chipset) that, when configured by applications executing on control unit 22, define the operations to be performed on packets received by forwarding component 30. Each chipset may in some examples represent a "packet forwarding engine" (PFE) (or simply "forwarding engine"). Each chipset may include different chips each having a specialized function, such as queuing, buffering, interfacing, and lookup/packet processing. Each of the chips may represent application specific integrated circuit (ASIC)-based, field programmable gate array (FPGA)-based, or other programmable hardware logic. A single forwarding component 30 may include one or more packet forwarding engines. Programmable circuitry 26 may be operably coupled to a memory. Programmable circuitry 26 may have an internal forwarding path, where at least a portion of the forwarding path is stored to the memory and is executable by the at least one packet forwarding engine. Other forwarding components of forwarding components 30 may include no programmable circuitry. Alternative network devices may include forwarding components 30 with no programmable circuitry.

Operations including packet forwarding operations may be performed, for example, on each packet by any of a corresponding ingress interface, an ingress forwarding component 30, an egress forwarding component 30, an egress interface or other components of router 16 to which the packet is directed prior to egress, such as one or more service cards. Programmable circuitry 26 processes packets to identify packet properties and perform actions bound to the properties. Each programmable circuitry 26 includes forwarding path elements that, when executed, cause that programmable circuitry 26 to examine the contents of each packet (or another packet property, e.g., incoming interface) and on that basis make forwarding decisions, apply filters, and/or perform accounting, management, traffic analysis, and load balancing, for example. In one example, each programmable circuitry 26 arranges forwarding path elements as next destination data that can be chained together as a series of "hops" in a forwarding topology along an internal packet forwarding path for the network device. The result of packet processing determines the manner in which a packet is forwarded or otherwise processed by programmable circuitry 26 of forwarding components 30 from its input interface on one of IFCs 27 to, at least in some cases, its output interface on one of IFCs 27.

To ensure the efficient movement of data, router 16 may be designed so that ASICs are forwarding path elements in example programmable circuitry 26 and are configured to handle the forwarding of data. ASICS are Packet Forwarding Engine Components that when properly coordinated, manages the forwarding of packets in accordance with the above-mentioned internal forwarding path through router 16's internal infrastructure and out of IFCs 27. Each ASIC implement implements a forwarding path element and performs one task of a forwarding operation (e.g., identifying a next destination).

As an alternative, the above-mentioned forwarding path elements are stored and executed in control unit 22 instead of programmable circuitry 26. An example alternative programmable circuitry 26 implements a thin PFE in ASICs that are physically located on the FPCs and the PICs. The thin PFE abstracts most of a typical PFE by offloading packet forwarding operations to user space containers 25 running on routing engine 23 hardware. In at least one alternative examples, processing circuitry of control unit 22 performs forwarding decisions by identifying a next destination or next hop for a packet and instructing programmable circuitry 26 on forwarding that packet. In many instances, the forwarding path elements perform lookup operations, such as a tree (or trie) search, a table (or index) search, a filter determination and application, or a rate limiter determination and application. Lookup operations locate, within a lookup data structure (e.g., a lookup tree), an item that matches packet contents or another property of the packet or packet flow, such as the inbound interface of the packet.

To illustrate by way of a comparison between network devices that do not implement at least some of the techniques described herein and router 16, hardware in forwarding components of a current device may execute program code that receives, from a master network device in accordance with a timing protocol, a synchronization packet storing time information for correcting a local clock of router 16. Instead of the hardware in the forwarding components 30, hardware in control unit 22 (e.g., the processing circuitry of routing engine 23) processes the synchronization packet to access the time information for correcting the local clock of router 16. For example, a process may run in user space container 25A to access the time information from the synchronization packet, compute a clock offset in accordance with a synchronization operation of the timing protocol and adjust the clock. The process may communicate an instruction to forwarding component 30A via an interface of platform 24; the instruction is to prompt forwarding component 30A to transmit the synchronization packet through IFC 27. Hence, in this example, a routing component of an example network device implementing at least one technique described herein performs an operation (e.g., clock correction) that might otherwise be performed by hardware in forwarding components.

In one example, control unit 22, by the processing circuitry, configures and instantiates containers 25 to execute code packages for providing routing plane and data plane functionality. Control unit 22 instantiates first container 25A to execute a code package (e.g., routing engine software) for operating the routing engine 23 and second containers of which an example second container 25B to execute a code package (e.g., forwarding engine software) for operating one or more corresponding forwarding engine in a respective forwarding component, for example, forwarding component 30A. Routing protocol processes are run by first container 25A to learn/establish routes and store routing and forwarding information in user-level memory or kernel-level memory. Forwarding path elements and other processes are run by second container 25B to use the stored information to configure the forwarding component 30A on forwarding packets (to a next destination) along the learnt/established routes.

Figure 3:
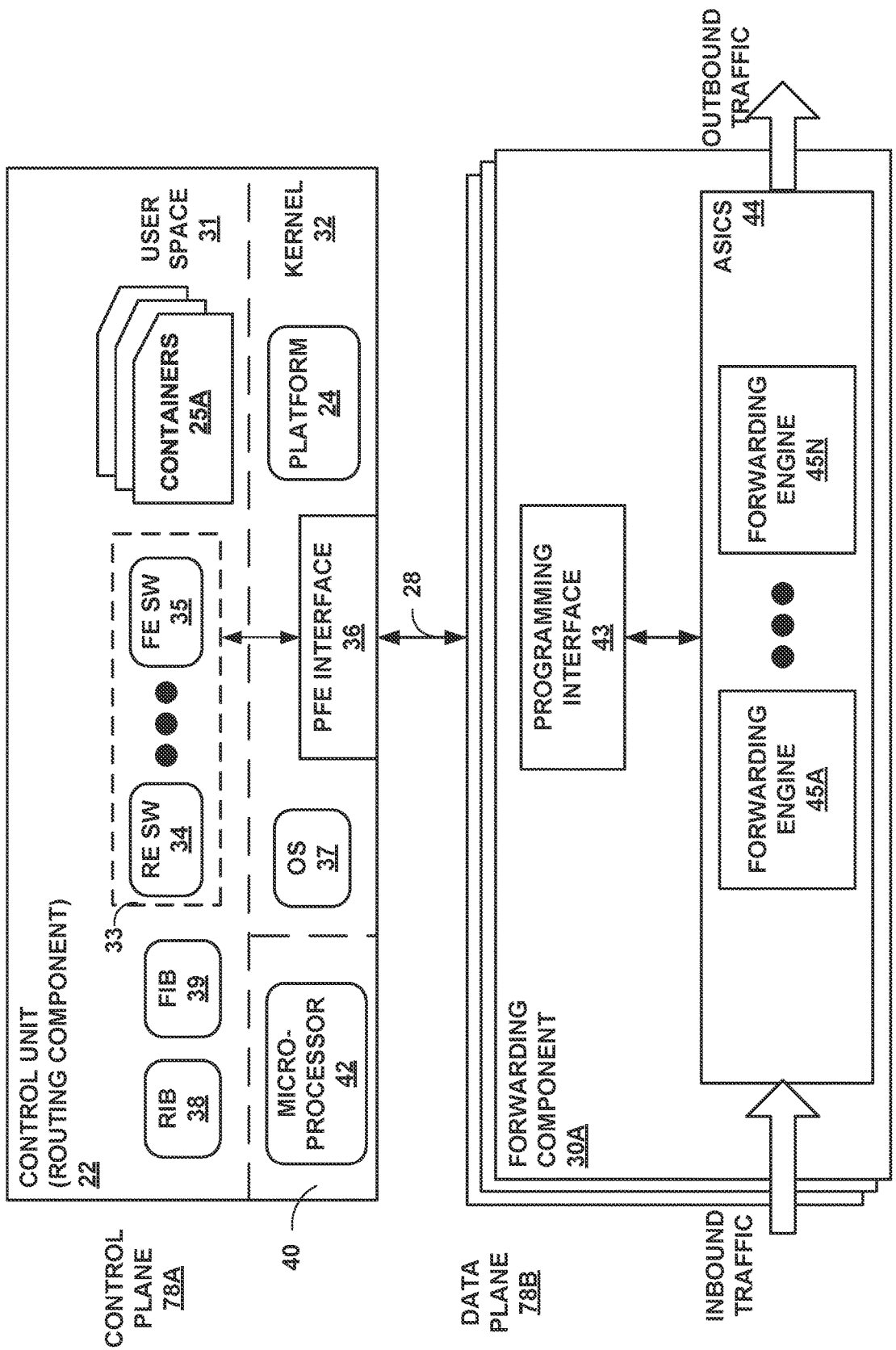
FIG. 3 is a block diagram illustrating an example architecture of an example network device that operates in accordance with various aspects of the techniques described in this disclosure.

FIG. 3 is a block diagram illustrating example instances of control unit 22 and forwarding component 30A of forwarding components 30 of FIG. 2 in further detail. In an example network device implementing some of the techniques of the present disclosure, control unit 22—including a routing engine chipset—operates as a routing component and line cards—including forwarding engine chipsets—operates as forwarding components 30. In this example, control unit 22 provides a control plane 78A operating environment for user-level processes and kernel-level processes by way of execution of software code in user space 31 and kernel 32, respectively, including execution of kernel-level platform 24 to generate user space containers 25. In some examples, platform 24 may use routing and/or forwarding information such as RIB 38 and/or FIB 39 to execute user space containers 25 with RE SW 34 and/or FE SW 35. In other examples, specialized hardware programmed with routing and/or forwarding information such as RIB 38 and/or FIB 39 may execute containers 25.

Code packages 33 include software code for various programs including programs running in user-space containers 25 such as Routing Engine Software 34 ("RE SW 34") and Forwarding Engine Software 35 ("FE SW 35"). The various programs in this example include processes that result from executing code packages 33 and include background programs known as daemons such as command-line interface daemon ("CLI"), Simple Network Management Protocol daemon ("SNMP"), and/or the like. In this respect, control plane 78A may provide routing plane, service plane, and management plane functionality for router 16. Various instances of control unit 22 may include additional programs not shown in FIG. 2 that perform other control, management, or service plane functionality and/or drive and otherwise manage forwarding plane functionality for router 16. Control unit 22 may in some instances represent a control unit of a service card or a combination of control units of a routing component that provides routing plane functionality and a service card.

Forwarding component 30A, in combination with other forwarding components 30 of the example network device (e.g., router 16 of FIG. 2), leverages routing component hardware in control unit 22 to implement forwarding plane 78B (also known as a "data plane") functionality to handle packet processing from ingress interfaces on which packets are received to egress interfaces to which packets are sent. Forwarding plane 78B, via user space containers 25 running on control unit 22 hardware, determines data packet forwarding through the example network device, applies services, rate limits packet flows, filters packets, and otherwise processes the packets using service objects and lookup data installed by control plane 78A to forwarding plane 78B. In this manner, forwarding component 30A may be manufactured with fewer hardware components. As described herein, processing circuitry and other hardware in control unit 22 performs packet processing operations on behalf of Forwarding component 30A. Control unit 22 may instruct forwarding component 30A on forwarding packets through internal infrastructure and ultimately to the packets' next destination(s). To the extent forwarding component 30A includes processing hardware (if at all), forwarding component 30A processes commands from control unit 22 including commands instructing forwarding component 30A on modifying packet data (e.g., packet header attribute). While FIG. 3 illustrates only forwarding component 30A in detail, each of forwarding components 30 of the example network device comprises similar modules that perform substantially similar functionality.

User space containers 25 operate over and interact with kernel 32, which provides a run-time operating environment for and facilitates communications to/from user containers 25. Kernel 32 also provides the run-time operating environment for user-level processes supporting user space containers and facilitates inter-process communications between user-level processes and user containers 25. Kernel 32 offers libraries and drivers by which user space containers 25 may interact with the underlying hardware/software of the example network device including control unit 22 and forwarding component 30A. In one example, Packet Forwarding Engine interface 36 ("PFE interface 36") may comprise one or more user- or kernel-level libraries, programs, toolkits, application programming interfaces (APIs) and may communicate information (e.g., control and data messages, code for programming forwarding engines, etc.) to forwarding components 30 via internal communication link 28 using sockets. PFE interface 36 of kernel 32 comprises a kernel-level library by which user-level processes or user-level libraries may interact with programming interface 43 of forwarding component 30A. PFE interface 36 may include, for example, a sockets library for communicating with forwarding component 30A over dedicated network links. For example, user space container 25A communicates, via PFE interface 36, forwarding information to forwarding component 30A, which configures programmable circuitry within forwarding engine 26A to forward packets to a next destination in accordance with the forwarding information. In one example, the forwarding information include a mapping between a packet's final destination or a packet's route to a next destination (e.g., a next hop). In some examples, platform 24 may handle the communication of the forwarding information via PFE interface 36 on behalf of user space container 25A.

Kernel 32 may comprise an operating system (OS) 37, for example, a UNIX operating system derivative such as Linux or Berkeley Software Distribution (BSD). OS 37 may be a proprietary OS for network devices. OS 37 includes software code that when executed into software processes, perform control plane functionality such as by enabling router system management, monitor and troubleshoot protocol and network connectivity problems, controlling router interfaces and the router chassis, supporting routing engine protocols (e.g., Internet routing protocols), and performing forwarding engine operations. OS 37 processes run on top of kernel 32 to invoke platform 24, enabling communication between FE SW 35 processes running in user space containers 25 and forwarding engines 45 in ASICS 44. Hence, kernel 32 (e.g., via PFE interface 36 and/or OS 37) provides user space containers 25 with a direct link to FE 45A.

RE SW 34 executes one or more interior and/or exterior routing protocols to exchange routing information with other network devices and store received routing information in routing information base 38 ("RIB 38"). RIB 38 may include information defining a topology of a network, including one or more routing tables and/or link-state databases. RE SW 34 resolves the topology defined by routing information in RIB 38 to select or determine one or more active routes through the network and then installs these routes to forwarding information base 39 ("FIB 39"). Typically, RE SW 34 generates FIB 39 in the form of a radix or other lookup tree to map packet information (e.g., header information having destination information and/or a label stack) to next hops and ultimately to interface ports of interface cards associated with respective forwarding components 30.

Hardware environment 40 of control unit 22 comprises microprocessor 42 that executes program instructions (or software code) loaded into a main memory (not shown in FIG. 3) from storage (also not shown in FIG. 3) in order to execute a software stack, including both kernel 32 and user space 31, of control unit 22. Microprocessor 42 may comprise one or more general-purpose or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein. Microprocessor 42 may be a portion of routing engine hardware including routing engine 23 of FIG. 2.

In some examples, microprocessor 42 may assume the role as microprocessor for forwarding component 30A, for example, by executing programming interface 43 to enable communications and configuring ASICS 44 in general and forwarding engines 45 in particular. As another example, microprocessor 42 of control unit 22 provides forwarding component 30A with computing services such as diagnostic services. There are a number of ways in which microprocessor 42 supports forwarding engines 45 operating in ASICs 44 with processing hardware capacities, for example, to offload forwarding operations.

RE SW 34 may represent a software stack for the controlling the routing engine chipset installed in control unit 22. When executed as routing protocol processes by processing circuitry (e.g., in the routing engine chipset), OS 37 invokes routing functionality provided by RE SW 34. As described herein, a first container (e.g., container 25A) of containers 25 may be configured to execute RE SW 34 of code packages 33 and run the routing protocol processes to populate RIB 38 and FIB 39.

As illustrated in FIG. 3, containers 25 may correspond to container files that memorialize (e.g., in an image) a run-time operating system environment. These container files, when mounted by platform 24, generate user space containers 25 to run separate instances (e.g., of FE SW 35) where each instance represents a specific forwarding component 30 and provides that component's forwarding plane functionality. The techniques described herein utilize containers 25 as a substitute for conventional forwarding plane technology where the forwarding components 30 include sufficient processing hardware.

User space containers 25 are configured to run on the processing circuitry and/or dedicated hardware and to execute various programs (e.g., daemons) for forwarding packets in accordance with the above-mentioned routing tables and forwarding tables. Each user space container 25 is a run-time operating system environment for processes that execute forwarding plane functionality as described herein. In one example, processing circuitry of control unit 22 configures and generates containers 25 to execute code packages 33, and these containers 25, when fully instantiated and in operation, provide routing plane and data plane functionality for the example network device. Control unit 22 instantiates first container 25A to execute a code package (e.g., routing engine software or RE SW 34) for operating the routing engine and second container 25B to execute a code package (e.g., forwarding engine software or FE SW 35) for operating corresponding forwarding engines 35 in forwarding component 30A.

A typical PFE in a conventional forwarding component includes following (packet) processing components: Packet Processor ASIC (e.g., Layer 2/Layer 3 Packet Processing ASIC, which performs Layer 2 and Layer 3 encapsulation and decapsulation, and manages the division and reassembly of packets within the router); Queuing and Memory Interface ASICs, which manage the buffering of data cells in memory and the queueing of notifications; Internet Processor, which provides the route lookup function; Switch Interface ASICs, which extract the route lookup key and manage the flow of data cells across switch fabric (e.g., the switch fabric 29 of FIG. 2); and Media-specific ASICs on the PICs perform control functions tailored to the PIC media types. Forwarding component 30A may include none or any number of the above-mentioned processing components in ASICs 44. Forwarding component 30A may configure an element in ASICs 44 to be a partial processing component, such as by performing only a fraction of that component's tasks for a conventional forwarding component.

Examples such as the following leverage routing component hardware for forwarding or data plane functionality. In one example, container 25A executes processes to mimic any number of the processing components (or a portion thereof) in forwarding component 30. In one example, container 25A performs a number of applicable tasks in provisioning of data plane functionality. These tasks may include initializing and monitoring ASICs 44 when operating as PFEs. In one example, container 25A inserts code and data, via PFE interface 36 and programming interface 43, for programming ASICs 44 to perform a number of tasks in support of data plane functionality without host (e.g., general-purpose) processing hardware such as a CPU in forwarding component 30A.

When performing an example forwarding operation on a packet, user-level processes running and/or dedicated hardware in user space container 25A execute most if not all of the above-mentioned processing components of a PFE. In one example, user space container 25A accesses FIB 35 to determine a next destination for packets headed to a specific network device address and/or directed along an established route. User space container 25A proceeds to insert, into ASICs 44, code for completing the forwarding operation to the next destination and data including the forwarding information indicating the next destination. As an alternative, user space container 25A operates in real-time such that upon identifying a next destination for incoming packets, user space container 25A instructs the FE 45A on properly forwarding the packet. The container 25A may issue a command via PFE interface 36 and programming interface 43 to ASICS 44, which prompts FE 45A to transmit the packet to the next destination. The container 25A may invoke a function call on programming interface 43 and/or ASICs 44 to forward the packet to the next destination.

Forwarding components in accordance with the techniques described herein may include a minimum capacity of processing circuitry to operate packet forwarding engines or include no processing circuitry (e.g., a hardware processor-less forwarding component) and perform a bare minimum number of tasks for completing forwarding operations. An example of minimum processing circuitry may, in some cases, may include only a micro-processor while other examples include some capacity of dedicate hardware such as ASICs.

In one example, forwarding component 30A includes ASICs 44 (e.g., packet processors) that execute a thin forwarding engine requiring a minimal level of hardware resource consumption in accordance with techniques described herein. Forwarding component 30A may implement the thin forwarding engine as a processing path through at least two ASICS. Forwarding component 30A also stores additional data structures (not illustrated) in computer-readable storage media, such as internal or external SRAM.

Forwarding component 30A, by virtue of being CPU-less hardware, does not require processing circuitry, which is typically found in current technologies, a microprocessor to execute micro-code for configuring a complicated packet processing path through ASICS 44, or any other programmable circuitry. Forwarding component 30A may utilize an ASIC in ASICs 44 to instantiate programming interface 43. As an alternative, control unit 22 may execute software code to generate programming interface 43. In other examples, forwarding component 30A includes a micro-processor to execute a microkernel to provide an operating environment for interfaces. The micro-processor may be used to execute programming interface 43 to provide an interface for/to control unit 22. Programming interface 43 receives messages from control unit 22 directing forwarding component 30A to configure portions of ASICs 44 including forwarding engines 45 and to forward packets to next destinations.

User space container 25A via PFE interface 36 may direct programming interface 43 to operate hardware such as ASICS 44. ASICS 44 includes programmable circuitry configured to implement a packet processing path to forward packets through forwarding component 30A until transmission hardware (e.g., IFCs 27A) manages the transmission of those packets to other network devices.

Figure 4:
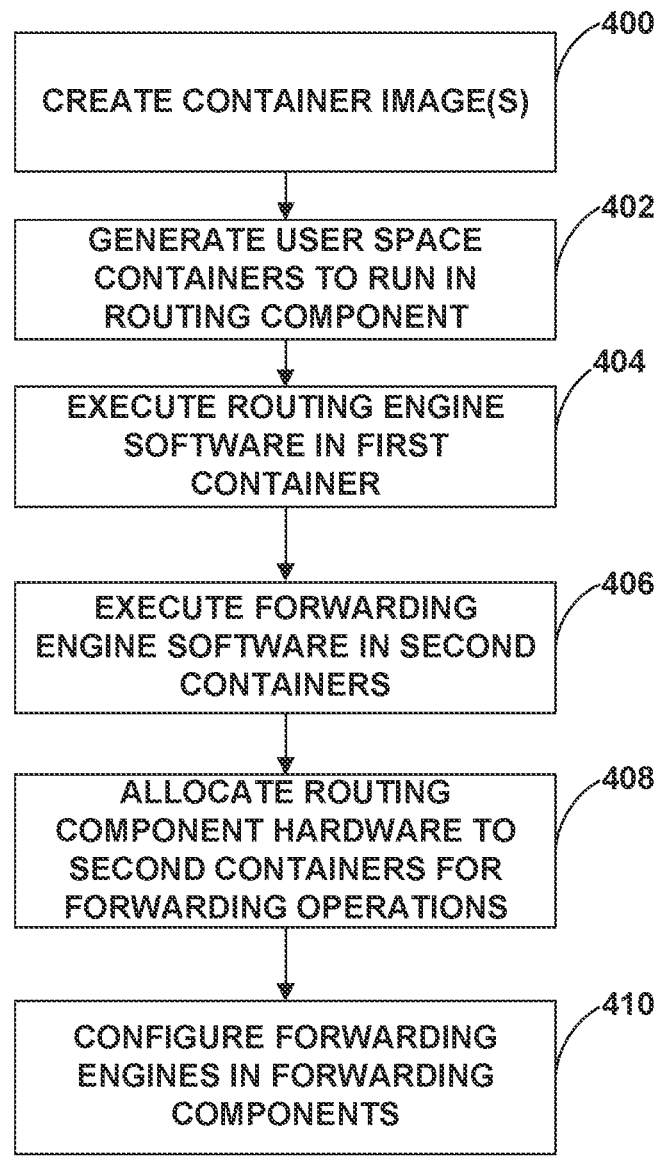
FIG. 4 is a flowchart illustrating operations in accordance with various aspects of the techniques described in this disclosure.

FIG. 4 is a flowchart illustrating an example operation by a control unit of a network device in accordance with various aspects of the techniques described in this disclosure. FIG. 4 is described below within the context of control unit 22 of FIGS. 2 and 3. In other examples, operations described in FIG. 4 may be performed by one or more other components, modules, systems, or devices. Further, in other examples, operations described in connection with FIG. 4 may be merged, performed in a difference sequence, omitted, or may encompass additional operations not specifically illustrated or described.

Control unit 22 may generate an operating environment for user space containers 25 to execute the example operation, which as described herein may include a forwarding (engine) operation. Control unit 22 commences the example operation with container files storing container images of which each defines a container to operate a forwarding component with one rom or corresponding forwarding engines. Each container 25 may execute software code and run processes on processing circuitry in control unit 22 of router 16 or another example network device. For example, control unit 22 may instantiate container 25A with a software stack for operating the forwarding component.

Control unit 22 creates one or more container images from one or more code packages 33 and other programs (400). In one example, control unit 22 creates the container image by arranging a software stack and indicating dependencies in a container file that, when mounted and processed by platform 24, generates a user space container configured to run user-level processes. One container image results in a container for running user-level routing engine processes while another container image results in a container for running user-level forwarding engine processes.

Control unit 22 generates the user space containers (or simply "containers") to run in processing circuitry of a routing component (402). As described herein, the containers that execute software stacks for forwarding engines in forwarding components 30 are running in the routing component of router 16. Router 16 leverages these containers instead of executing these or similar software stacks in processing circuitry of forwarding components and therefore, is an improved network device with minimum forwarding component processing hardware. This is in contrast to other implementations where the forwarding components includes a substantial amount of processing power. Processing circuitry of control unit 22 provide sufficient processing power for operating both the routing component and the forwarding components of router 16. Not only is the resource footprint of router 16 reduced, router 16 may require less space, for example, in a chassis.

Control unit 22 executes routing engine software in first user space container (404). Control unit 22, to operate as the routing component, brings online a routing engine (e.g., routing engine 23 of FIG. 2), which is configured to generate routing and forwarding information and to establish or learn routes in compliance with certain routing protocols. This routing and forwarding information in combination with other information may be used by at least one container to direct packet communications between network devices in a network. In accordance with these and/or other protocols, the first container—running on processing circuitry of control unit 22—executes and runs user-level processes as described herein for the routing engine. This may involve generating and storing, in either user space or kernel space, information to direct packet communications to destination network devices in the network.

Control unit 22 executes forwarding engine software in second user space containers (406). In one example, control unit 22 executes the forwarding engine software to run, on processing circuitry, computing elements (e.g., processes, threads, objects, etc.) for operating (physical) forwarding engines residing in forwarding components 30. The user space containers 25 may be configured to provide a spectrum of data plane functionality for the forwarding engines residing in forwarding components 30. Hence, user space containers 25 perform some combination of forwarding engine operations including the following: Layer 2 and Layer 3 packet switching, route lookups, and packet forwarding. As described herein, these computing elements may form virtual forwarding engines in which forwarding operations are executed in user space containers 25 instead of in the forwarding engines residing in forwarding components 30. In response to incoming packets, these user space containers 25 parse packet header data to extract destination network addresses and then, perform lookup tasks to identify network addresses for the incoming packets' respective next destinations. These user space containers 25 may program the forwarding engines residing in forwarding components 30 to perform a minimum number of tasks for the forwarding operations.

Control unit 22 allocates routing component hardware to the forwarding engines for forwarding operations (408). In one example, a portion of the routing component hardware allocated towards running user space containers 25 is further allocated towards maintaining the forwarding engines; some implementations of user space containers 25 maintain the forwarding engines in forwarding component 30 by running diagnostics, resetting operations, inserting code on the forwarding engines. In one example, control unit 22 may dedicate processing power (e.g., a number of CPU processor cycles over a period of time) towards performing forwarding operations on incoming packets. The allocation amount is based on a level at which forwarding plane functionality is offloaded onto second user space containers on behalf of forwarding component. If control unit 22 performs most or all forwarding engine tasks, a sufficient amount is allocated to the second user space containers. This may be because very little or no hardware is installed in the forwarding components.

Control unit 22, as instructed by the second user space containers, configures forwarding engines in forwarding components using information determined by the first container (410). As described herein, control unit 22 may configure the forwarding engines with sufficient code and data for forwarding packets between input and output interfaces. In one example, the second user space containers execute a code package that runs diagnostics on the forwarding components, establish resource identifiers and configuration settings in OS 37 for the forwarding components, insert code and data for forwarding packets to their respective next destinations, and/or the like. An example forwarding engine in forwarding component 30 uses the application-specific integrated circuits (ASICs) to perform at least some data plane functionality. The example forwarding engine may be configured to perform some (but not all) of the tasks for the forwarding operations.

Figure 5:
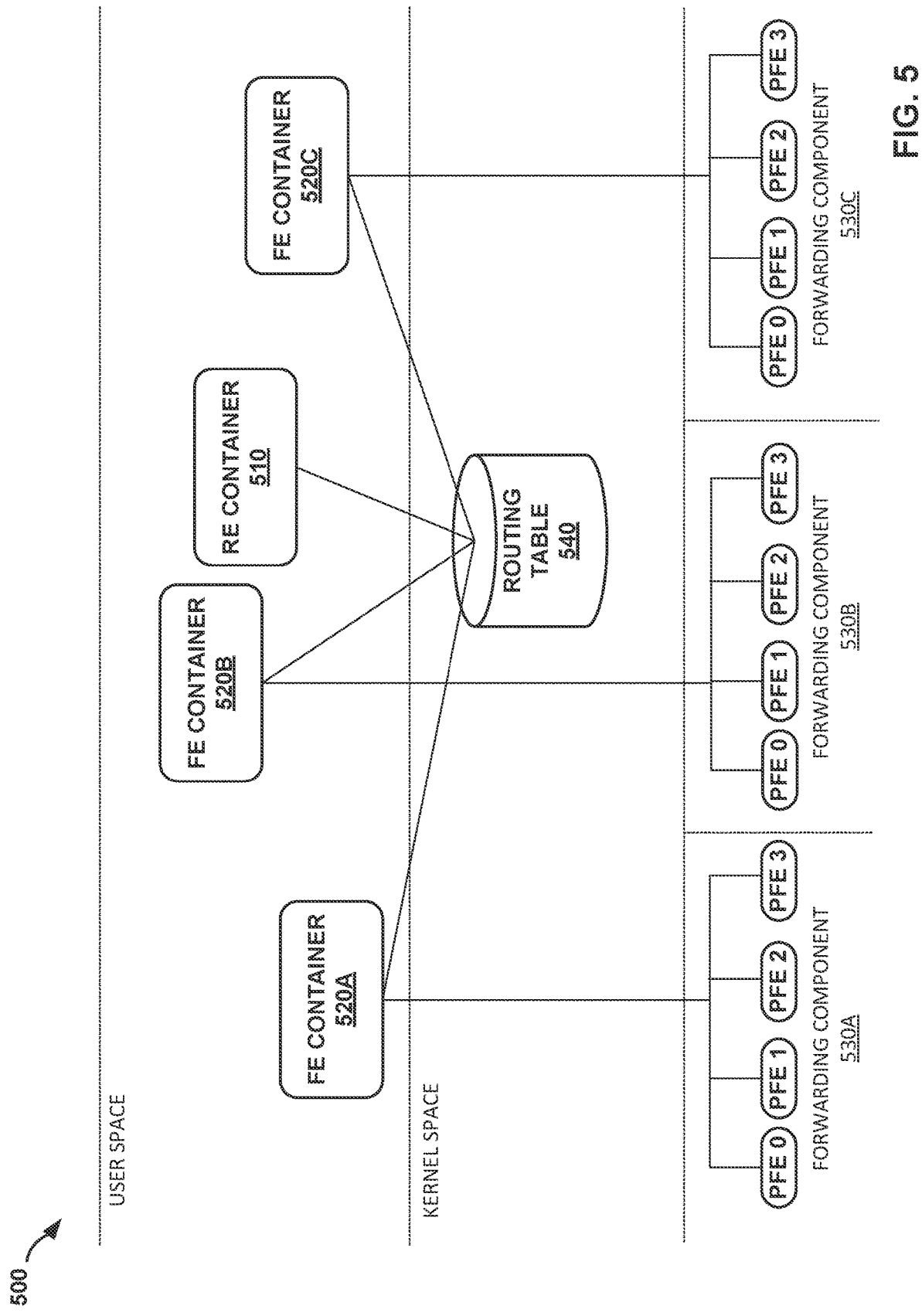
FIG. 5 is a conceptual diagram illustrating an example architecture with generic user space containers in accordance with various aspects of the techniques described in this disclosure.

FIG. 5 is a conceptual diagram illustrating an example architecture with user space containers in accordance with various aspects of the techniques described in this disclosure. In general, these user space containers, being agnostic of an underlying hardware infrastructure, represent isolated execution environments that are abstractions of hardware elements on which one or more code packages run. The example architecture of FIG. 5 may employ various virtualization/containerization technologies for container generation/management such that, in the description of FIG. 5, the disclosed techniques are generic to any known container structure/model. Hence, the user space containers may be arranged in accordance with any structure or model while realizing one or more advantages/benefits as described herein.

The example architecture of an example network device 500, as described herein, may be conceptualized as having a control plane and a data plane. The control plane allocates hardware and software resources amongst kernel space and user space. The data plane includes forwarding component 530A, forwarding component 530B, and forwarding component 530C. In this example, routing table 540 includes routing and forwarding information for operating packet forwarding engines (PFEs) in each of the forwarding components 530. Routing table 540 is stored in kernel space and maintained by kernel level processes. To generate the routing and forwarding information for routing table 540, control unit 22 generates RE container 510 to operate the routing engine which includes executing routing protocols at generating the routing and forwarding information. In user space, forwarding engine (FE) containers 520A, 520B, and 520 C use the information in routing table 540 to direct (packet) communications to network devices along a route.

Network device 500 partitions the virtual and/or physical address space provided by main memory and (in the case of virtual memory) by disk into user space, allocated for running user processes, and kernel space, which is protected and generally inaccessible by user processes. An operating system kernel (not shown in FIG. 5) may execute in kernel space and may include, for example, a Linux, Berkeley Software Distribution (BSD), another Unix-variant kernel, or a Windows server operating system kernel, available from Microsoft Corp. Network device 500 may in some instances execute a hypervisor to manage virtual machines (also not shown in FIG. 2) instead of containerization technology to manage containers such as FE containers 520A-C and RE container 510. An example hypervisor (also not shown in FIG. 2) Example hypervisors include Kernel-based Virtual Machine (KVM) for the Linux kernel, Xen, ESXi available from VMware, Windows Hyper-V available from Microsoft, and other open-source and proprietary hypervisors. In some examples, specialized hardware programmed with routing and forwarding information may execute the virtual machines.

In one example, FE container 520A executes a software stack (e.g., FPC host software stack) to configure forwarding engines PFE 0, PFE 1, PFE 2, and PFE 3 in forwarding component 530A. As instructed by the executing software stack, FE container 520A runs one or more processes to initialize and, then monitor these PFEs. PFE monitoring may be orchestrated via a number of diagnostic tasks that are designed to identify errors or faults in forwarding component 530A. FE container 520A may insert program code into forwarding component 530A for operating these PFEs; in some examples, these PFEs use the inserted code (in ASICs) to perform most (if not all) of a packet forwarding operation on each incoming packet while in alternative examples, these PFEs may be thin PFEs that offload packet forwarding decisions to FE container 520A. When a packet arrives at forwarding component 530A, one of the PFEs performs a lookup operation using a destination IP address to identify a next destination (or hop) for that packet. As alternative, the PFEs query FE container 520A, which responds with a message indicating a next destination for forwarding the packet. In turn, forwarding component 530A, via the PFEs and transmission hardware in example network device 500, transmits the packet to that next destination.

To illustrate by way of an example forwarding component 530A having an example PFE architecture, that forwarding component 530A may be comprised of two ASICs or chips: an first chip or ASIC in charge of packet memory management, queuing packets, "cellification," interfacing with a switch fabric, and featuring both fast on-chip (SRAM) memory and off-chip memory; and a second chip or ASIC to perform packet lookup, packet firewalling and policing, packet classification, queue assignment, and packet modification (e.g., push/swap/push Multi-Protocol Label Switching (MPLS) headers, CoS remarks, etc.). A FIB such as a forwarding table is stored in off-chip memory and includes mappings between a network address (e.g., destination IP address) and a next destination (e.g., a next device or network) along an active route. In accordance with instructions in the above-mentioned software stack, FE container 520A may configure PFEs in forwarding component 530A by inserting into these two chips or ASICs suitable program code for performing the above-mentioned tasks. FE container 520A may (via function call) instruct the control plane (e.g., an operating system on control unit 22 of FIG. 2) to bring example forwarding component 530A online for packet processing. The inserted code may be executed by minimal processing resources in example forwarding component 530A. By "minimal" processing resources, the present disclosure refers to a minimal amount of available processing capacity within the ASICs or chips themselves. As an example, an example ASIC may include a hardware processor capable of providing a capacity of only enough processing power to operate that example ASIC and (possibly) another second ASIC.

The inserted code may be executed by processing circuitry in the control plane or routing component. In another example, FE container 520A may configure example forwarding component 530A (e.g., with a thin PFE) by inserting code that offloads the above-mentioned tasks to software running in FE container 520A. In either example, FE container 520A isolates execution of the software stack to operate forwarding engines PFE 0, PFE 1, PFE 2, and PFE 3 that are in forwarding component 530. The software stack for the forwarding components is isolated in from other software running outside this container.

In an example where example network device 500 is a router with, as an forwarding component 530A, a line card/FPC housing multiple PICs and connecting them to the rest of the router. On ingress, each PIC includes one or more ASICs to parse, prioritize, and queue the packets before forwarding them across a switching fabric (e.g., a midplane) to an appropriate destination interface/IFD/port. On egress, each PIC includes one or more ASICs prioritizes, queues, re-assembles, and forwards packets out through the appropriate destination interface/IFD/port. Because processing resources in a control plane of network device 500 assumes the role of the line card/FPC host CPU, no such CPU is needed in a board of the line card/FPC. In some examples, each PIC includes sufficient processing resources to execute programming in the ASICs. The control plane (i.e., routing component) generates a user space container, as an example FE container 520A, to run on processing resources and performs task to initialize, program, and/or monitor the ASIC(s) in each PICs. In some examples, up to four PICs can be mixed and matched within a single line card/FPC, increasing configuration flexibility and network scalability, while maximizing efficiency.

Figure 6:
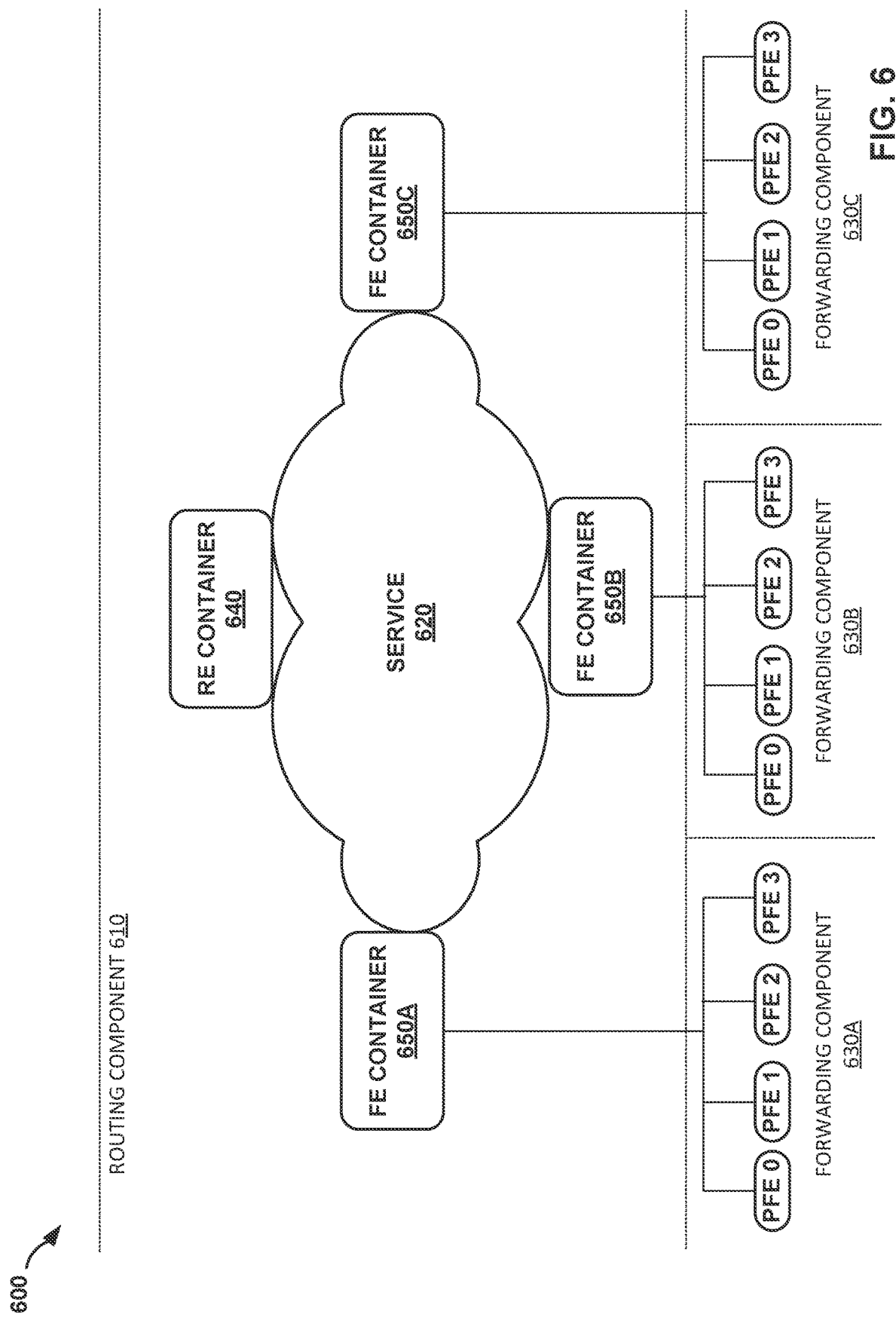
FIG. 6 is a conceptual diagram illustrating an example architecture with Docker containers in accordance with various aspects of the techniques described in this disclosure.

FIG. 6 is a conceptual diagram illustrating an example architecture with Docker containers in accordance with various aspects of the techniques described in this disclosure. Example network device 600 implements the example architecture in accordance with the techniques of the present disclosure.

As illustrated in FIG. 6, example network device 600 has an architecture that can be conceptualized as having two planes. A first plane is manifested as routing component 610 and a second plane is represented by forwarding components 630A, 630B, and 630C. Routing component 610 may be further broken down into a kernel and a user space of which service 620 operates in the user space. In one example, service 620 is a database cloud service where routing engine of routing component 610 and forwarding engines of forwarding components 630A, 630B, and 630C exchange routing information.

Dockers containers refers to containers generated by a product (a platform as a service (PaaS) product) that uses OS-level virtualization to deliver software in containers that are isolated from one another. Docker® containers bundle their own software, libraries and configuration files. Service 620 manages all Docker® containers on a single operating system kernel and therefore use fewer resources than virtual machines.

Similar to FIG. 5, example network device 600 includes a routing engine (RE) container 640 and forwarding engine (FE) containers 650A, 650B, and 650C of which each FE container 650 provides operating system-level virtualization to run at least four virtual forwarding engines corresponding to packet forwarding engines (PFEs) in a respective forwarding component 630. Service 620, by operating in user space instead of the kernel, is an alternative to a kernel-level database service through which routing engines and forwarding engines exchange routing and forwarding information.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

In an example where example network device 600 includes, as an example forwarding component 630A, a line card/FPC having DRAM for memory resources, a CPU for processing resources, and SSD for storage resources, capacities for these resources are significantly reduced in comparison to other network devices. In some examples, the CPU may be eliminated entirely while the SSD may be eliminated, for example, if the DRAM can hold the forwarding table. By implementing techniques described herein, the control plane (or routing component) hardware including DRAM, a CPU, SSD, and other elements are leveraged to compensate for reductions in the line card/FPC. A portion of these hardware elements are used to generate, as an example FE container 650A, a user space container to run the line card/FPC software stack in the control plane and configure ASIC(s) or chip(s) to operate PFE(s) in the line card/FPC. When an incoming packet arrives via interface/IFD/port, a PFE performs packet forwarding by at least looking up the incoming packet's next destination in the forwarding table stored in the DRAM of the line card/FPC, directing the packet through switch fabric to an outgoing interface/IFD/port, and then, transmitting the packet on a network link to the next destination.

In one example, instead of the line card/FPC's CPU (e.g., μKernel's CPU), control plane/routing component processing resources (e.g., CPU, microprocessor, microcontroller, etc.) performs necessary supervisory/management tasks on the PFEs including initialization and maintenance. The line card/FPC and the routing component exchange data (e.g., instructions) via two embedded Gigabit Ethernet interfaces. A user space container, via the routing component's processing resources, may communicate with ASICs via a PCIe Bus for programming an example PFE in the ASICs and pushing the forwarding information base (FIB) to a first chip (e.g., LU chip memory) and basic scheduling configuration to a second chip (e.g., MQ/XM chip). A 12C Bus allows the routing component's containers to monitor and retrieve environmental (power, temperature, status, etc.) information from the line card/FPC. The PFE's ASICs may communicate with each other and with the fabric chips via HSL2 (High Speed Link version 2) links. Each of these operations provides a significant burden on resources and at least some of that burden can be avoided through at least one technique described herein. Furthermore, by eliminating some (if not all) of the typical PFE architecture (e.g., eliminating the line card's CPU and/or some of PFE's ASICs), a smaller form factor and/or an overall cost reduction can be achieved for network devices implementing at least one technique as described herein.

For ease of illustration, only a limited number of devices (e.g., routers 12, 16, containers 510, 520, forwarding components 530, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

The invention claimed is:

1. A method, comprising:
generating, by processing circuitry of a routing component of a network device of a network having a topology of network devices, user space containers to operate corresponding forwarding engines in each of a plurality of forwarding components of the network device, wherein each of the forwarding components of the network device includes minimal processing resources that are insufficient to execute the user space containers to operate the corresponding forwarding engines;
storing, by the processing circuitry of the routing component, information for directing communications involving the plurality of forwarding components and the network devices;
allocating, by the processing circuitry of the routing component, a portion of the processing circuitry of the routing component to execute each of the user space containers; and
configuring, by at least one user space container running on the processing circuitry of the routing component, one or more corresponding forwarding engines in a respective forwarding component using the information.

2. The method of claim 1, wherein configuring the one or more corresponding forwarding engines further comprises:
identifying, by the processing circuitry of the routing component, a next destination for a packet processed by a forwarding component of a user space container; and
communicating, by a forwarding engine of the forwarding component, the packet to the next destination.

3. The method of claim 1, wherein generating the user space containers further comprises generating, by the processing circuitry of the routing component, a user space container to run code packages to operate a routing engine and to generate the information, wherein the information comprises routing information and forwarding information.

4. The method of claim 3, wherein storing the routing information further comprises generating, by the routing engine running in the processing circuitry of the routing component, the routing information in user space or kernel space of the routing component.

5. The method of claim 1, wherein configuring the one or more corresponding forwarding engines further comprises inserting, by the at least one user space container running in the processing circuitry of the routing component, code into programmable circuitry in the forwarding components, the inserted code to operate forwarding engines in the forwarding components.

6. The method of claim 1, wherein configuring the one or more corresponding forwarding engines further comprises running a diagnostic on the forwarding components.

7. The method of claim 1, wherein configuring the one or more corresponding forwarding engines further comprises creating a container image from code packages.

8. The method of claim 7, wherein the container image comprises a DOCKER image.

9. The method of claim 1, wherein configuring the one or more corresponding forwarding engines further comprises directing, by the processing circuitry of the routing component, communications between the user space containers and the plurality of forwarding components.

10. The method of claim 1, wherein configuring the one or more corresponding forwarding engines further comprises executing, by the user space containers running in the processing circuitry of the routing component, packet forwarding operations of the plurality of forwarding components.

11. The method of claim 1, wherein the forwarding components comprise at least one of the following: physical interface cards (PICs), flexible physical interface cards (FPCs), and dense port concentrators (DPCs).

12. The method of claim 1, wherein configuring the one or more corresponding forwarding engines further comprises executing, by the user space containers running on the processing circuitry of the routing component, code packages to operate the forwarding engines, wherein the executed code packages in each user space container use the information for configuring the one or more corresponding forwarding engines in the respective forwarding component.

13. A network device, comprising:
a plurality of forwarding components, wherein each forwarding component is associated with one or more forwarding engines for communicating packets to other network devices in a network having a topology comprising the network device and the other network devices, and wherein each of the forwarding components of the network device includes minimal processing resources that are insufficient to operate the associated one or more forwarding engines;
control unit to operate a routing component, the control unit comprising processing circuitry configured to:
perform routing engine operations on the processing circuitry;
generate user space containers to run on the processing circuitry and to operate the one or more forwarding engines associated with each of the plurality of forwarding components;
store information for directing communications between the plurality of forwarding components and the other network devices;
allocate a portion of the processing circuitry of the routing component to execute each of the user space containers; and
configure, by at least one user space container, one or more corresponding forwarding engines associated with a respective forwarding component using the information.

14. The network device of claim 13, wherein the control unit further comprises processing circuitry configured to identify a next destination for a packet processed by a forwarding component corresponding to a user space container, and communicate, by a forwarding engine of the forwarding component, the packet to the next destination.

15. The network device of claim 13, wherein the control unit further comprises processing circuitry configured to generate a user space container to run code packages of a routing engine, wherein the user space container to generate the information to comprise routing information and forwarding information.

16. The network device of claim 15, wherein the control unit further comprises processing circuitry configured to generate, by the routing engine, the routing information in user space or kernel space of the routing component.

17. A non-transitory computer-readable medium comprising instructions for causing a programmable processor to:
generate, by processing circuitry of a routing component of a network device of a network having a topology of network devices, user space containers to operate forwarding engines in each of a plurality of forwarding components of the network device, wherein each of the forwarding components of the network device includes minimal processing resources that are insufficient to execute the user space containers to operate the corresponding forwarding engines;
store, by the processing circuitry of the routing component, information for directing communications between the plurality of forwarding components and the network devices;
allocate a portion of the processing circuitry of the routing component to execute each of the user space containers; and
configure, by at least one user space container running on the processing circuitry of the routing component, one or more corresponding forwarding engines in a respective forwarding component using the information.

18. The computer-readable medium of claim 17, wherein the instructions cause the processor to:
insert, by the processing circuitry of the routing component, code into programmable circuitry in the forwarding components, the inserted code to operate forwarding engines in the forwarding components.

* * * * *